W. H. GORR.
LOCK NUT.
APPLICATION FILED APR. 19, 1919.

1,338,862. Patented May 4, 1920.

WITNESSES.
C. L. Waal
H. D. Chase

INVENTOR
Wallace H. Gorr
By R. S. Caldwell
ATTORNEY.

UNITED STATES PATENT OFFICE.

WALLACE H. GORR, OF MILWAUKEE, WISCONSIN.

LOCK-NUT.

1,338,862.      Specification of Letters Patent.      Patented May 4, 1920.

Application filed April 19, 1919. Serial No. 291,234.

*To all whom it may concern:*

Be it known that I, WALLACE H. GORR, a citizen of the United States, and resident of Milwaukee, in the county of Milwaukee and State of Wisconsin, have invented new and useful Improvements in Lock-Nuts, of which the following is a description, reference being had to the accompanying drawings, which are a part of this specification.

The invention relates to lock nuts and is more particularly designed for obtaining finer locking adjustments than is possible with the well known form of castellated nut.

One of the objects of this invention is to provide a bolt with radially disposed recesses and a cap to fit the nut and having a tongue engageable in any one of the recesses to prevent rotation of the nut when said cap has been fitted thereon. With this construction the nut may be locked on the bolt in less than a sixth of a turn so that finer adjustments may be had than with the usual castellated nut.

The invention further consists in the several features hereinafter set forth and more particularly defined by claim at the conclusion hereof.

Figure 1:
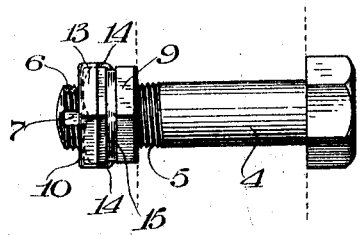
Figure 2:
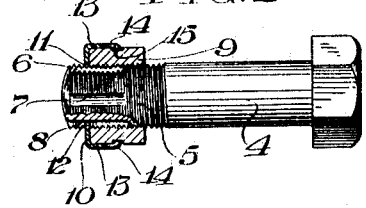
Figure 3:
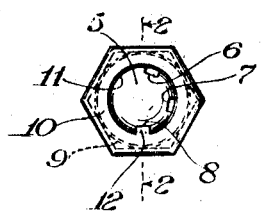

In the drawings: Fig. 1 is an elevation view of the device embodying the invention; Fig. 2 is a section taken on the line 2—2 of Fig. 3; Fig. 3 is an end view of the device.

In the drawings: The numeral 4 designates the bolt having a threaded end 5 provided with radially disposed recesses 6, 7 and 8. While only three recesses have been shown it will be understood that other recesses may be cut into the bolt. A nut 9 preferably of polygonal shape and more particularly the common form of hexagonal nut is mounted on the threaded end of the bolt.

To secure the nut against turning with respect to the bolt when the desired adjustment of the nut longitudinally of the bolt has been obtained, a cap 10 is fitted on to the end of the nut and has an opening 11 therein to receive the bolt and a locking tongue 12 projecting inwardly to engage in any one of the recesses 6, 7 or 8 that is then normal to one of the faces of the nut. The cap has a hexagonal flange portion 13 fitting the hexagonal nut and to prevent longitudinal movement of the cap with respect to the nut said cap is provided with yielding tongues 14 having bent ends engageable in an annular recess 15 cut in the nut.

With this construction six different adjustments of the nut with respect to the bolt for a single turn may be had for each recess; that is, there are six different positions of the nut in which the cap may be placed so as to bring the tongue into the recess, and by providing the three recesses, 6, 7 and 8, as shown, eighteen possible adjustments are provided for a single turn of the nut about the bolt, and by providing other notches there will be a corresponding increase in the number of adjustments obtainable by a single turn of the nut on the bolt. The cap is put on after the nut has been screwed onto the bolt and may be subsequently removed by forcing the tongues out of locking engagement with the recess 15.

As shown in the drawing the recesses are spaced unequal distances apart and this is the preferred construction as it enables me to secure the desired adjustments.

Since the nut is of polygonal shape and the cap fits into it, said cap cannot turn upon the nut and as the tongue prevents the cap turning with respect to the bolt, the nut is effectually prevented from turning with respect to the bolt when the cap is in place.

What I claim as new and desire to secure by Letters Patent is:

In a lock nut, the combination of a bolt having radially disposed recesses at its threaded end and spaced at unequal distances apart, a polygonal nut on the bolt, a cap having a flanged portion fitting over the nut and apertured to receive the bolt and provided with a single tongue engageable in one of the recesses.

In testimony whereof I affix my signature in presence of two witnesses.

WALLACE H. GORR.

Witnesses:
    R. S. C. CALDWELL,
    H. D. CHASE.